C. A. KIEL.
BALL AND SOCKET PIPE JOINT.
APPLICATION FILED FEB. 26, 1919.

1,317,193.

Patented Sept. 30, 1919.

Inventor,
CLEMENS A. KIEL.

By Max A. Schmidt

Attorney

UNITED STATES PATENT OFFICE.

CLEMENS A. KIEL, OF LOUISVILLE, KENTUCKY.

BALL-AND-SOCKET PIPE-JOINT.

1,317,193.

Specification of Letters Patent. Patented Sept. 30, 1919.

Application filed February 26, 1919. Serial No. 279,277.

*To all whom it may concern:*

Be it known that I, CLEMENS A. KIEL, a citizen of the United States, residing at Louisville, in the county of Jefferson and State of Kentucky, have invented certain new and useful Improvements in Ball-and-Socket Pipe-Joints, of which the following is a specification.

This invention relates to improvements in pipe joints and more particularly ball-and-socket joints, the invention having for its object to provide a novel and improved joint of this kind which enables the parts to be swung far enough to place the same at a right angle to each other.

The object stated is attained by means of a combination and arrangement of parts to be hereinafter described and claimed, and in order that the same may be better understood, reference is had to the accompanying drawing forming a part of this specification.

The preferred embodiment of the invention has been shown, but it will be understood that various changes and modifications may be made without a departure from the spirit and scope of the invention as claimed hereinafter.

In the drawing,—

Figure 1:
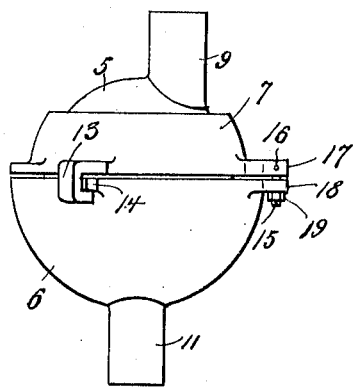
Figure 1 is an elevation of the joint.
Figure 2:
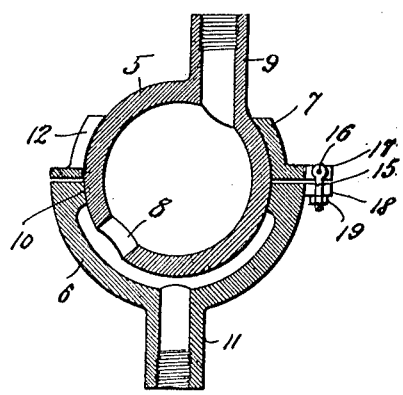
Fig. 2 is a central longitudinal section thereof.

Referring specifically to the drawing, the joint is composed of a ball member 5, a socket member 6 and a retaining ring 7 for holding these parts assembled.

The ball member 5 is hollow and that portion which seats in the socket has a side port 8 opening thereinto. The ball member also has, on the outside of the socket, a projecting neck 9 which is internally screw threaded for attaching to a pipe.

The socket member 6 envelops that portion of the ball member having the port 8, and it is dimensioned to leave a space in the socket into which the port opens. At the outer end of the socket is an enlargement 10 which forms a bearing ring encircling the ball member and is in sliding contact with the outer surface thereof. The socket member also has an attaching neck or nipple 11 opening into the interior thereof. The fluid entering the ball member 5 therefore escapes from the port 8 thereof into the socket member and flows out of the latter through the nipple 11; or the flow may be in a reverse direction.

Figure 3:
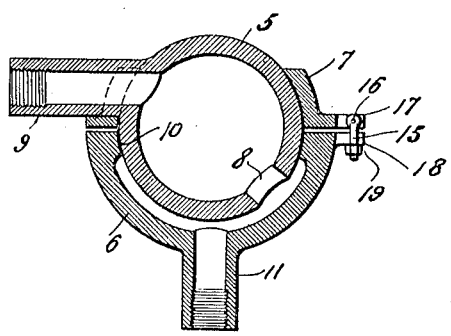
Fig. 3 is a longitudinal section showing the parts in another position.
Figure 4:
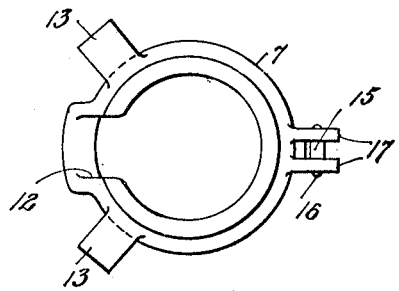
Fig. 4 is a plan view of a retaining ring.

It will be noted that the neck or nipple 9 is not located centrally with respect of the ball member 5 but is positioned off to one side of the longitudinal center line thereof, or offset laterally, this being for the purpose of permitting the ball member to be turned over to one side 90 degrees to position the nipple 9 at a right angle to the socket member 6, as shown in Fig. 3. The retaining ring 7 has a recessed portion 12 on one side so that the nipple 9 may clear the same when it is placed as shown in Fig. 3, it now seating in the recess. It will also be noted that the port 8 is not at the center of the ball member 5, but is offset so that it will not be covered by the bearing ring 10 when the right-angle adjustment is made.

The ring 7 encircles that portion of the ball member 5 which is outside the socket member 6, and it has hooks 13 seating under lugs 14 on the latter. An additional fastening is made by a bolt 15 pivoted at 16 between outstanding ears 17 on the ring, and seating between outstanding ears 18 on the socket member 6, with a nut 19 on the bolt beneath the last-mentioned ears. Upon unscrewing the nut, the bolt can be swung outward clear of the ears 18, and then by giving the ball or the socket member a slight turn to disengage the hooks 13 from the lugs 14, the ring 7 can be taken off, which uncouples the two members. By a reversal of this operation the two members can be easily and quickly coupled in assembled relation, and clamped in adjusted position.

I claim:

1. A ball-and-socket pipe joint comprising a hollow ball member having a port which is offset from the center thereof, a socket-member in which the ported end of the ball member is inclosed, said socket member having an interior bearing ring slidably engaged by the ball member, and the ported portion of the ball member being spaced from the wall of the socket, a retaining ring encircling that portion of the ball which is outside the ball member, said ring having a side recess, and the ball member having a projecting neck adapted to seat in said recess when the ball member is swung to place the neck perpendicular to the socket member, and means for clamping the ring to the socket member.

2. A ball-and-socket pipe joint comprising a hollow ball member having a port which is offset from the center thereof, a socket-member in which the ported end of the ball member is inclosed, said socket member having an interior bearing ring slidably engaged by the ball member, and the ported portion of the ball member being spaced from the wall of the socket, a retaining ring encircling that portion of the ball which is outside the ball member, said ring having a side recess, and the ball member having a projecting neck adapted to seat in said recess when the ball member is swung to place the neck perpendicular to the socket member, said neck being offset laterally from the longitudinal center line of the ball member, and means for clamping the ring to the socket member.

3. A ball-and-socket pipe joint comprising a hollow ball member having a port, a socket-member in which the ported end of the ball member is inclosed, said socket member having an interior bearing ring slidably engaged by the ball member, and the ported portion of the ball member being spaced from the wall of the socket, a retaining ring encircling that portion of the ball which is outside the ball member, said ring having a side recess, and the ball member having a projecting neck adapted to seat in said recess when the ball member is swung to place the neck perpendicular to the socket member, said neck being offset laterally from the longitudinal center line of the ball member, and means for clamping the ring to the socket member.

In testimony whereof I affix my signature.

CLEMENS A. KIEL.

Copies of this patent may be obtained for five cents each, by addressing the "Commissioner of Patents, Washington, D. C."